(12) United States Patent
Achenbach et al.

(10) Patent No.: US 11,327,791 B2
(45) Date of Patent: May 10, 2022

(54) APPARATUS AND METHOD FOR OPERATING AN ISSUE QUEUE

(71) Applicant: Arm Limited, Cambridge (GB)

(72) Inventors: Michael David Achenbach, Austin, TX (US); Robert Greg McDonald, Austin, TX (US); Nicholas Andrew Pfister, Austin, TX (US); Kelvin Domnic Goveas, Austin, TX (US); Michael Filippo, Driftwood, TX (US); . Abhishek Raja, Austin, TX (US); Zachary Allen Kingsbury, Austin, TX (US)

(73) Assignee: Arm Limited, Cambridge (GB)

( * ) Notice: Subject to any disclaimer, the term of this patent is extended or adjusted under 35 U.S.C. 154(b) by 328 days.

(21) Appl. No.: 16/546,752

(22) Filed: Aug. 21, 2019

(65) Prior Publication Data

US 2021/0055962 A1 Feb. 25, 2021

(51) Int. Cl.
*G06F 9/48* (2006.01)
*G06F 9/38* (2018.01)
*G06F 9/52* (2006.01)
*G06F 9/50* (2006.01)
*G06F 9/30* (2018.01)

(52) U.S. Cl.
CPC .............. *G06F 9/4881* (2013.01); *G06F 9/38* (2013.01); *G06F 9/3836* (2013.01); *G06F 9/5038* (2013.01); *G06F 9/52* (2013.01); *G06F 9/30032* (2013.01)

(58) Field of Classification Search
None
See application file for complete search history.

(56) References Cited

U.S. PATENT DOCUMENTS

| 6,609,190 | B1 * | 8/2003 | Kahle | ..................... G06F 9/384 |
| | | | | 712/214 |
| 6,697,939 | B1 * | 2/2004 | Kahle | ................... G06F 9/3836 |
| | | | | 712/244 |
| 2005/0251666 | A1 * | 11/2005 | Chaudhry | ............. G06F 9/3842 |
| | | | | 712/228 |

* cited by examiner

*Primary Examiner* — Qing Yuan Wu
(74) *Attorney, Agent, or Firm* — Nixon & Vanderhye P.C.

(57) ABSTRACT

An apparatus provides an issue queue having a first section and a second section. Each entry in each section stores operation information identifying an operation to be performed. Allocation circuitry allocates each item of received operation information to an entry in the first section or the second section. Selection circuitry selects from the issue queue, during a given selection iteration, an operation from amongst the operations whose required source operands are available. Availability update circuitry updates source operand availability for each entry whose operation information identifies as a source operand a destination operand of the selected operation in the given selection iteration. A deferral mechanism inhibits from selection, during a next selection iteration, any operation associated with an entry in the second section whose source operands are now available due to that operation having as a source operand the destination operand of the selected operation in the given selection iteration.

20 Claims, 8 Drawing Sheets

APPARATUS AND METHOD FOR OPERATING AN ISSUE QUEUE

BACKGROUND

The present technique relates to an apparatus and method for operating an issue queue.

Instructions fetched from memory for execution by a processing unit are decoded in order to identify the operations that the processing unit is to perform in order to execute those instructions. Sometimes the operations are broken down into one or more micro-operations (also referred to as micro ops). Herein, operations and micro-operations will collectively be referred to as operations hereafter.

An issue queue is typically used to temporarily buffer the operations identified by decoding instructions, prior to those operations being issued to the relevant execution unit within the processing unit. An execution unit will not be able to perform an operation until the source operands required for that operation are available, and hence the operation can be temporarily buffered within the issue queue until the source operands are available.

In order to improve performance, many modern processors support out-of-order (OOO) execution of instructions, where instructions may be executed out of order with respect to original program order in order to seek to increase throughput of the processing unit, with retiring of instructions then happening in order. In such systems, the issue queue is one of the data structures that can be used to support OOO execution.

However, the performance of modern OOO processors is constrained by the depth of the instruction window from which instruction-level parallelism (ILP) and memory-level parallelism (MLP) can be extracted. It is often the case that the instruction window size is constrained by the size of the issue queue, since the larger the number of entries in the issue queue, the larger the pool of operations that can be considered when determining whether a reordering of the operations can be performed in order to seek to improve throughput.

However, the issue queue architecture is typically a critical speed path in a processor design, and as a result increasing the size of the issue queue can result in a decrease in the frequency at which the processor can be operated, which itself will impact performance, and this typically limits the extent to which the issue queue capacity can be increased. Accordingly, it would be desirable to provide an improved mechanism for operating an issue queue, with the aim of further improving the performance of the processor.

SUMMARY

In one example arrangement, there is provided an apparatus comprising: an issue queue comprising a first section and a second section, each of the first section and the second section comprising a number of entries, and each entry employed to store operation information identifying an operation to be performed by a processing unit; allocation circuitry to receive operation information for a plurality of operations, and to apply allocation criteria to determine, for each operation, whether to allocate the operation information for that operation to an entry in the first section or an entry in the second section, the operation information being arranged to identify each source operand required by the associated operation and availability of each source operand; selection circuitry to select from the issue queue, during a given selection iteration, an operation to be issued to the processing unit, the selection circuitry being arranged to select the operation from amongst those operations whose required source operands are available; availability update circuitry to update source operand availability for each entry whose operation information identifies as a source operand a destination operand of the selected operation in the given selection iteration; and a deferral mechanism to inhibit from selection by the selection circuitry, during at least a next selection iteration following the given selection iteration, any operation associated with an entry in the second section whose required source operands are now available due to that operation having as a source operand the destination operand of the selected operation in the given selection iteration.

In another example arrangement, there is provided a method of operating an issue queue, comprising: arranging the issue queue to have a first section and a second section, each of the first section and the second section comprising a number of entries, and each entry employed to store operation information identifying an operation to be performed by a processing unit; receiving operation information for a plurality of operations, and applying allocation criteria to determine, for each operation, whether to allocate the operation information for that operation to an entry in the first section or an entry in the second section, the operation information being arranged to identify each source operand required by the associated operation and availability of each source operand; selecting from the issue queue, during a given selection iteration, an operation to be issued to the processing unit, the selected operation being chosen from amongst those operations whose required source operands are available; updating source operand availability for each entry whose operation information identifies as a source operand a destination operand of the selected operation in the given selection iteration; and employing a deferral mechanism to inhibit from selection, during at least a next selection iteration following the given selection iteration, any operation associated with an entry in the second section whose required source operands are now available due to that operation having as a source operand the destination operand of the selected operation in the given selection iteration.

In a still further example arrangement, there is provided an apparatus comprising: issue queue means comprising a first section and a second section, each of the first section and the second section comprising a number of entries, and each entry for storing operation information identifying an operation to be performed by a processing unit; allocation means for receiving operation information for a plurality of operations, and for applying allocation criteria to determine, for each operation, whether to allocate the operation information for that operation to an entry in the first section or an entry in the second section, the operation information being arranged to identify each source operand required by the associated operation and availability of each source operand; selection means for selecting from the issue queue means, during a given selection iteration, an operation to be issued to the processing unit, the selection means for selecting the operation from amongst those operations whose required source operands are available; availability update means for updating source operand availability for each entry whose operation information identifies as a source operand a destination operand of the selected operation in the given selection iteration; and deferral means for inhibiting from selection by the selection means, during at least a next selection iteration following the given selection iteration, any operation associated with an entry in the second section whose required source operands are now available due to that operation having as a source operand the destination operand of the selected operation in the given selection iteration.

BRIEF DESCRIPTION OF THE DRAWINGS

The present technique will be described further, by way of illustration only, with reference to examples thereof as illustrated in the accompanying drawings, in which.

DESCRIPTION OF EXAMPLES

Figure 1:
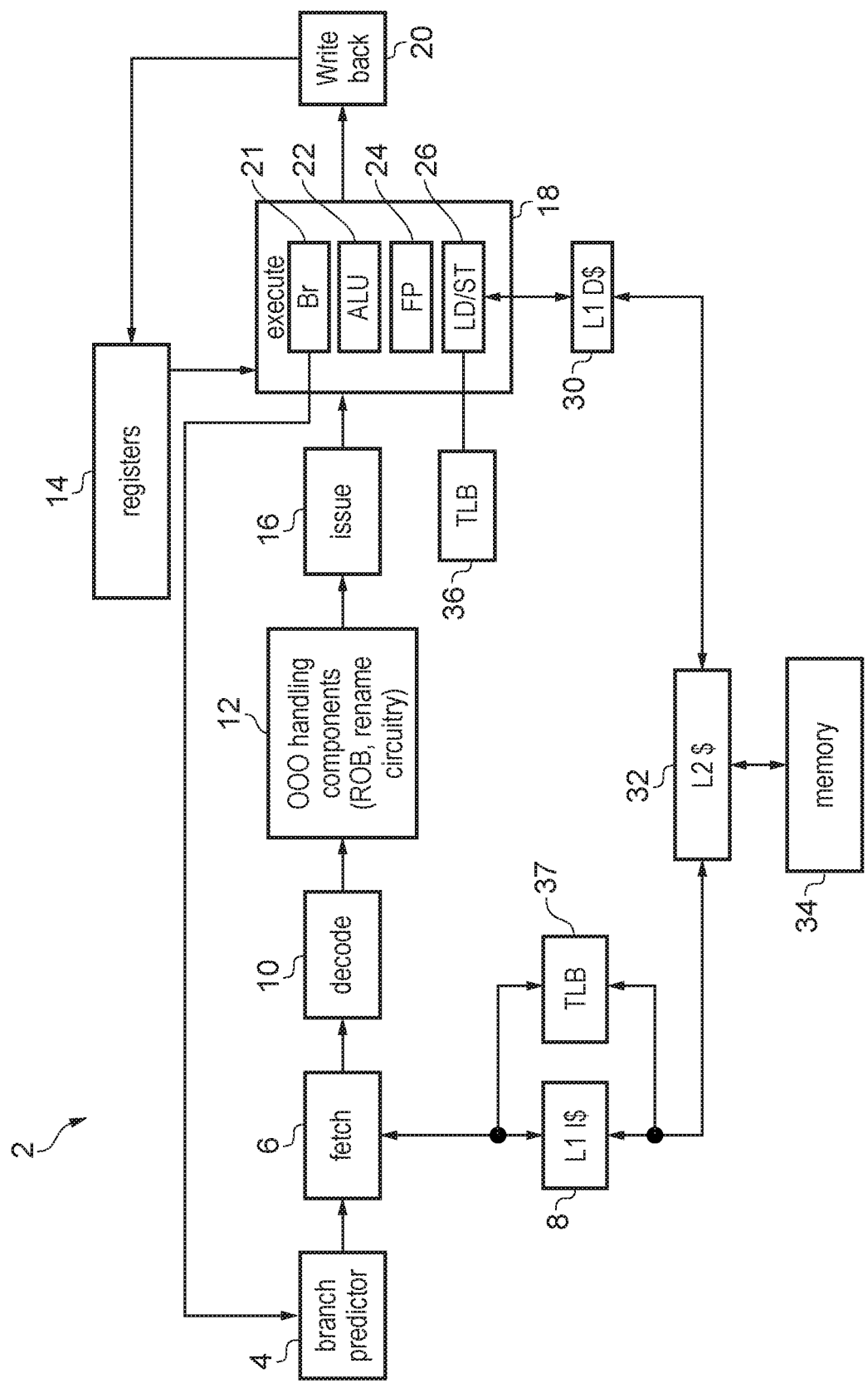
FIG. 1 schematically illustrates a data processing apparatus in accordance with one example.

The logical functions used to select and issue operations from an issue queue form a scheduler loop whose timing can be impacted as the size of the issue queue increases. In particular the scheduler loop comprises the following functions:

a) Pick an operation to be issued from all of the operations within the issue queue that are identified as being ready for issue;

b) Multiplex out the picked operation;

c) Issue the selected operation to the execution pipelines;

d) Update source availability information for the dependent operation(s) of the issued operation (the dependent operations being operations having a source operand that corresponds to the destination operand of the selected operation), and repeat.

The scheduler loop typically forms a critical loop from a timing perspective, and the size of the issue queue can impact on the performance of steps (a), (b), (d) above and thus is critical to the overall frequency capability of the scheduler function. The latency and bandwidth of the issue queue are also critical to performance, so it is important that the scheduler loop can be performed quickly, typically within a single clock cycle. Hence, whilst it is desirable to increase the capacity of the issue queue so as to increase the instruction window size as discussed earlier, the ability to increase the size of the issue queue is typically constrained by the requirement to perform the above scheduler loop efficiently. As will be discussed in more detail herein, the techniques described herein enable the effective capacity of the issue queue to be increased, without adversely impacting performance of the above described scheduler loop.

In particular, in one example arrangement an apparatus is provided that has an issue queue comprising a first section and a second section. Each of the first section and the second section comprises a number of entries, and each entry is employed to store operation information identifying an operation to be performed by a processing unit. Allocation circuitry is arranged to receive operation information for a plurality of operations, and to apply allocation criteria to determine, for each operation, whether to allocate the operation information for that operation to an entry in the first section or to an entry in the second section. The operation information is arranged to identify each source operand required by the associated operation and availability of each source operand.

Selection circuitry is then used to select from the issue queue, during a given selection iteration, an operation to be issued to the processing unit, the selection circuitry being arranged to select the operation from amongst those operations whose required source operands are available.

Availability update circuitry is then used to update source operand availability for each entry whose operation information identifies as a source operand a destination operand of the selected operation in the given selection iteration. There are a number of ways in which the source operands and destination operands may be identified, but typically these may be identified with reference to physical register values used to store data values. Hence, if the destination operand is identified by a particular physical register, and that same physical register is identified as a source operand for an operation in one of the entries of the issue queue, then the source operand availability indication for that source operand can be updated to identify that that source operand is now available, since it is known that the selected operation will be generating the required value.

Further, in accordance with the technique described herein, a deferral mechanism is used to inhibit from selection by the selection circuitry, during at least a next selection iteration following the given selection iteration, any operation associated with an entry in the second section whose required source operands are now available due to that operation having as a source operand the destination operand of the selected operation in the given selection iteration.

By such an approach, the capacity of the issue queue is extended through the provision of the second section in addition to the first section, but the entries in the second section are removed from the critical timing path, due to the use of the deferral mechanism. This can increase the time available to perform one or more of the functions within the scheduler loop in respect of the entries in the second section. As such, this enables the first section to be sized such that the selection circuitry and availability update circuitry can operate quickly enough in respect of the entries in the first section to maintain the required timing of the above described scheduler loop. However, since the entries in the second section are removed from the critical path by use of the deferral mechanism, a more relaxed timing is available to the selection circuitry and availability update circuitry when processing the entries in the second section. Hence, the capacity of the issue queue can be increased in order to increase the effective instruction window size, but without an adverse impact on the frequency at which the scheduling operation within the issue queue can be performed.

There are a number of ways in which the deferral mechanism can be implemented. However, in one example arrangement the deferral mechanism is arranged to defer provision to the selection circuitry of the updated source operand availability determined by the availability update circuitry for any operation associated with an entry in the second section whose required source operands are now available due to that operation having as a source operand the destination operand of the selected operation in the given selection iteration. Such an approach relaxes the timing constraint on the availability update circuitry when processing the entries in the second section, since it does not need to update the source operand availability information for entries in the second section in time for them to be considered in the same selection iteration by the selection circuitry. Furthermore, in a subsequent selection iteration where that updated source operand availability information is to be made available, it can be made available to the selection circuitry earlier in the selection iteration, since it will have already been determined by the availability update circuitry during a previous selection iteration.

The deferral mechanism can take a variety of forms, but in one example implementation comprises a buffer storage. The buffer storage can take a variety of forms, and could for example be formed of latch circuits that latch the values on certain signal paths at the end of each clock cycle, and hence for example can latch the signals being propagated over a path between the availability update circuitry and the selection circuitry so that the selection circuitry receives those signals a clock cycle later than they are produced by the availability update circuitry.

The allocation criteria applied by the allocation circuitry in order to determine whether a received item of operation information is allocated into an entry of the first section or into an entry of the second section can take a variety of forms. However, in one example implementation the allocation circuitry is arranged to apply, as the allocation criteria, criteria to ensure an age ordering between the operations whose operation information is stored in entries of the first section and the operations whose operation information is stored in entries of the second section, such that all operations whose operation information is stored in entries of the first section are older than all operations whose operation information is stored in entries of the second section. In particular, the fetched instructions will typically be decoded in original program order, and accordingly the operation information will be received by the allocation circuitry in original program order. Once the operation information has been allocated into the issue queue, then operations may be issued out of order to the execution units of the processing unit to support OOO execution. Hence the allocation circuitry will have an implicit understanding of the relative ageing of the items of operation information received, since those items will be received in age order. By applying a criteria that ensures that all operations whose operation information is stored in entries for the first section are older than all operations whose operation information is stored in entries of the second section, this can assist the steps taken by the selection circuitry. In particular, the selection circuitry may be arranged to preferentially select older operations whose source operands are available, and hence in such instances can be arranged to preferentially select an operation from the first section rather than the second section.

When employing the above form of allocation criteria, the allocation circuitry can be arranged to allocate operation information into the first section when there are no occupied entries in the second section, but once the entries in the first section are full and it becomes necessary to start allocating operation information into the entries of the second section, the allocation circuitry needs to take that fact into account when allocating further items of received operation information in order to ensure that all of the operation information in the first section is older than all of the operation information in the second section.

In one example arrangement, the allocation circuitry is further arranged to migrate operation information from an entry in the second section to an entry in the first section in order to maintain the age ordering. Thus, the allocation circuitry may be arranged to migrate operation information from an entry in the second section to an entry in the first section when the first section has an available entry. In particular, once there is at least one entry in the second section occupied, newly received items of operation information will not be able to be provided directly to entries of the first section until the entries in the second section have been migrated to entries in the first section.

In one example implementation, the allocation circuitry is arranged, when applying the allocation criteria, to allocate received operation information into an available entry of the first section when the second section has no active entries, where an active entry is an entry that stores operation information for an operation awaiting issuance to the processing unit. Hence, whilst there are no active entries in the second section, items of received operation information can be allocated directly into the entries of the first section, assuming available entries exist. However, the allocation circuitry is further arranged, when applying the allocation criteria, to allocate received operation information into an available entry in the second section when the second section has at least one active entry. By such an approach, this maintains the overall age ordering between the entries of the first section and the entries of the second section.

Whilst in the above described implementation, an age ordering is maintained between the operation information stored in entries of the first section and the operation information stored in entries of the second section, an age ordering constraint may or may not be applied between the individual entries of any particular section. Hence, in one example implementation, an age ordering constraint could be applied, but this may require a significant level of movement of operation information between the entries within a particular section. Thus, in accordance with an alternative implementation, at least one of the first section and the second section is able to store allocated operation information into any available entry without being constrained by age ordering between the entries in that section, and the apparatus is arranged to provide an age ordering storage to identify an age order for the operation information stored in the entries of that section. Hence, information can be freely allocated within the entries of a particular section and a separate structure can be used to keep track of the relative age of the items of operation information maintained within any particular section.

In one example arrangement, the selection circuitry is arranged to apply an age ordering criteria when selecting the operation from amongst those operations whose required source operands are available, so as to preferentially select the oldest operation from amongst those operations whose required source operands are available. It will be appreciated that whilst the selection circuitry might primarily make its decision based on age ordering, one or more other factors may also be taken into account by the selection circuitry when deciding which operation to select, for example the availability of the relevant functional unit within the processing unit, the availability of result buses for propagating the results generated by the operations performed by the functional units, etc.

When the selection circuitry applies the above-mentioned age ordering criteria, it will be appreciated that in implementations where the allocation criteria ensures that all operations stored in entries of the first section are older than all operations stored in entries of the second section, this will mean that the selection circuitry is arranged to preferentially select, from amongst those operations whose required source operands are available, an operation whose operation information is stored in an entry of the first section.

The selection circuitry can be arranged in a variety of ways. For example, a single selection mechanism may be arranged to review the operation information for all of the operations whose required source operands are available, whether that operation information be stored in the first section or the second section, and to then apply the above age ordering criteria to determine which one to select. However, in one particular example implementation the selection circuitry comprises separate picker circuits associated with the first section and the second section. In particular, in such an arrangement, the selection circuitry may comprise a first picker for selecting a first candidate operation from amongst operations whose operation information is stored in an entry of the first section and whose required source operands are available, and a second picker for selecting a second candidate operation from amongst operations whose operation information is stored in an entry of the second section and whose required source operands are available. Final selection circuitry is then used to choose the first candidate operation as the selected operation unless no valid first candidate operation is available, in which event the final selection circuitry is arranged to choose the second candidate operation as the selected operation.

By employing separate first and second pickers as described above, this can give rise to certain implementation benefits. For example, as discussed earlier, since the deferral mechanism may defer provision to the selection circuitry of the updated source operand availability determined by the availability update circuitry for certain operations associated with entries in the second section, this means that that updated source operand availability information is determined in a selection iteration prior to the selection iteration in which the second picker receives the operation information used by it to select the second candidate operation. Hence, during any given selection iteration, the second picker does not need to wait for the outcome of the operations performed by the availability update circuitry.

Hence, in one example arrangement, the second picker is arranged to perform selection of the second candidate operation in the next selection iteration before the availability update circuitry has produced the updated source operand availability, whilst the first picker is arranged to await the updated source operand availability from the availability update circuitry for any entries in the first section before performing selection of the first candidate operation in the next selection iteration. Hence, the second picker output can be produced earlier, and the final selection circuitry is then in a position to choose the selected operation as soon as the first picker has selected the first candidate operation.

The early availability of the output from the second picker can also result in other performance improvements within other components of the apparatus. For example, the apparatus may further comprise destination determination circuitry to determine the destination operand of the selected operation in each selection iteration. The destination determination circuitry may comprise initial evaluation circuitry to determine the destination operand for the second candidate operation and thereby exclude the destination operands for any other operations whose operation information is stored in an entry of the second section, and final evaluation circuitry to determine the destination operand for the selected operation when the final selection circuitry has chosen the selected operation, the final evaluation circuitry ignoring any destination operands excluded by the initial evaluation circuitry. Hence, by the time the final evaluation circuitry operates, a number of possible destination operands have already been excluded, hence improving the performance of the final evaluation circuitry.

The initial and final evaluation circuits can be formed in a variety of ways. However, in one example implementation, the initial evaluation circuitry may be formed as first level multiplexing circuitry to select the destination operand for the second candidate operation from amongst the possible destination operands for the entries in the second section. Similarly, the final evaluation circuitry may be formed as second level multiplexing circuitry to select the destination operand for the selected operation from amongst the possible destination operands for the entries in the first section and the destination operand for the second candidate operation as output by the first level multiplexing circuitry. Whilst the multiplexing circuits can be arranged in a variety of ways, in one example implementation each of the multiplexing circuits is hardwired so that it receives the destination operand information from each of the entries in the relevant section, irrespective of whether those entries store valid information or not, and irrespective of whether the operations in those entries are yet pickable or not, and hence irrespective of whether their required source operands are available. This means that the multiplexing circuitry does not need to be reconfigured during each selection iteration, and the operation of the selection circuitry ensures that the selected operation is an operation that is ready to be issued. Since the initial evaluation circuitry can perform its multiplexing function before the final evaluation circuitry is in a position to perform its multiplexing function, it can be seen that the overall performance of the destination determination circuitry can be improved, since the use of the initial evaluation circuitry reduces the size of the final evaluation circuitry required. In particular, the second level multiplexing circuitry that implements the final evaluation circuitry will have less inputs than would be the case had the initial evaluation circuitry not been used.

In one example implementation, the issue queue includes a number of initial entries into which the received operation information is initially stored prior to the allocation circuitry determining whether to allocate that received operation information into an entry of the first section or an entry of the second section. This allows for the received items of operation information to be buffered prior to the allocation circuitry determining whether that information should be stored in an entry of the first section or an entry of the second section, and accordingly the use of a certain number of initial entries can reduce the timing constraints that would otherwise apply on the allocation operation. The number of initial entries is a matter of design choice, for example dependent on the number of write ports that are provided into the issue queue. For example if two write ports are provided into the issue queue, it may be considered appropriate to provide two initial entries into which the items of operation information that may be received in a single cycle can be stored.

In one example implementation, the selection circuitry is also able to select from the initial entries in certain instances. In particular, the selection circuitry may be arranged to select the operation from an initial entry when the required source operands for that operation are available and none of the entries in the first and second sections store operation information for an operation whose required source operands are available.

If desired, the use of the first and second sections can be made configurable. For example, in response to at least one latency critical indicating event, the issue queue may be arranged to disable use of the second section. In particular, in situations where it is determined that the latency of the operations is critical, it may be considered inappropriate to allocate entries into the second section, since it is known that there will then be at least one cycle of delay when those operations are woken up by the actions of the availability update circuitry (assuming those operations are still in entries of the second section at that stage). Instead, it may be considered better to operate with a reduced size issue queue in such instances.

As another example of why it may be desirable to make the use of the first and second sections configurable, the selective disablement of use of the second section may be arranged to occur on detecting that there is little or no parallelism available when performing the operations. With more parallelism, a deeper queue has benefits and thus enabling the slower, second, section has benefits. However, with little or no parallelism, it may be inappropriate to consume the power involved in moving operations into and out of the slower section, since they are likely not going to be picked until later after they move to the faster, first, section. That movement of operations could hence burn power needlessly when instead dispatch could just have been stalled. Hence, portions of the instruction stream that do not benefit from the deeper queue can be identified and the slower section can then be disabled when executing those portions in order to save power.

Particular examples will now be described with reference to the Figures.

FIG. 1 schematically illustrates an example of a data processing apparatus 2 having a processing pipeline comprising a number of pipeline stages. The pipeline includes a branch predictor 4 for predicting outcomes of branch instructions and generating a series of fetch addresses of instructions to be fetched. A fetch stage 6 fetches the instructions identified by the fetch addresses from an instruction cache 8. A decode stage 10 decodes the fetched instructions to generate control information for controlling the subsequent stages of the pipeline. Out-of-order handling components 12 are provided at a next stage to handle out-of-order execution of instructions. These components can take a variety of forms, including for example a reorder buffer (ROB) and rename circuitry. The ROB is used to keep track of the progress of the instructions and ensure that the instructions are committed in order, even though they are executed out-of-order. A rename stage 12 performs register renaming to map architectural register specifiers identified by the instructions to physical register specifiers identifying registers 14 provided in hardware. Register renaming can be useful for supporting out-of-order execution as this can allow hazards between instructions specifying the same architectural register to be eliminated by mapping them to different physical registers in the hardware register file, to increase the likelihood that the instructions can be executed in a different order from their program order in which they were fetched from the cache 8, which can improve performance by allowing a later instruction to execute while an earlier instruction is waiting for an operand to become available. The ability to map architectural registers to different physical registers can also facilitate the rolling back of architectural state in the event of a branch misprediction. An issue stage 16 queues instructions awaiting execution until the required operands for processing those instructions are available in the registers 14. An execute stage 18 executes the instructions to carry out corresponding processing operations. A write back stage 20 writes results of the executed instructions back to the registers 14.

The execute stage 18 may include a number of execution units such as a branch unit 21 for evaluating whether branch instructions have been correctly predicted, an ALU (arithmetic logic unit) 22 for performing arithmetic or logical operations, a floating-point unit 24 for performing operations using floating-point operands and a load/store unit 26 for performing load operations to load data from a memory system to the registers 14 or store operations to store data from the registers 14 to the memory system. In this example the memory system includes a level one instruction cache 8, a level one data cache 30, a level two cache 32 which is shared between data and instructions, and main memory 34, but it will be appreciated that this is just one example of a possible memory hierarchy and other implementations can have further levels of cache or a different arrangement. The load/store unit 26 may use a translation lookaside buffer 36 and the fetch unit 6 may use a translation lookaside buffer 37 to map virtual addresses generated by the pipeline to physical addresses identifying locations within the memory system. It will be appreciated that the pipeline shown in FIG. 1 is just one example and other examples may have different sets of pipeline stages or execution units.

As discussed earlier herein, the techniques described herein relate specifically to the operation of the issue queue, and in particular provide a mechanism that enables the effective size of the issue queue to be increased, without needing to reduce the operating frequency whilst still enabling the scheduler loop to be performed at the desired speed, typically within a single clock cycle (i.e. enabling a selection iteration to take place each clock cycle if desired). By increasing the effective size of the issue queue, this can increase the instruction window size, and thereby improve the performance of the processor. It should be noted however that it is not essential to increase the number of entries in the issue queue. For example, for a particular number of entries constituting an issue queue, then by adopting the techniques described herein it would be possible to increase the operating frequency, since the scheduler loop could be performed more quickly, and this in turn would also improve performance. As another example, the techniques described herein could be used to reduce power consumption, by having fewer entries that are fast (and hence burn more power). Hence the techniques described herein can be used to obtain frequency, performance or power benefits, or a combination thereof.

Figure 2:
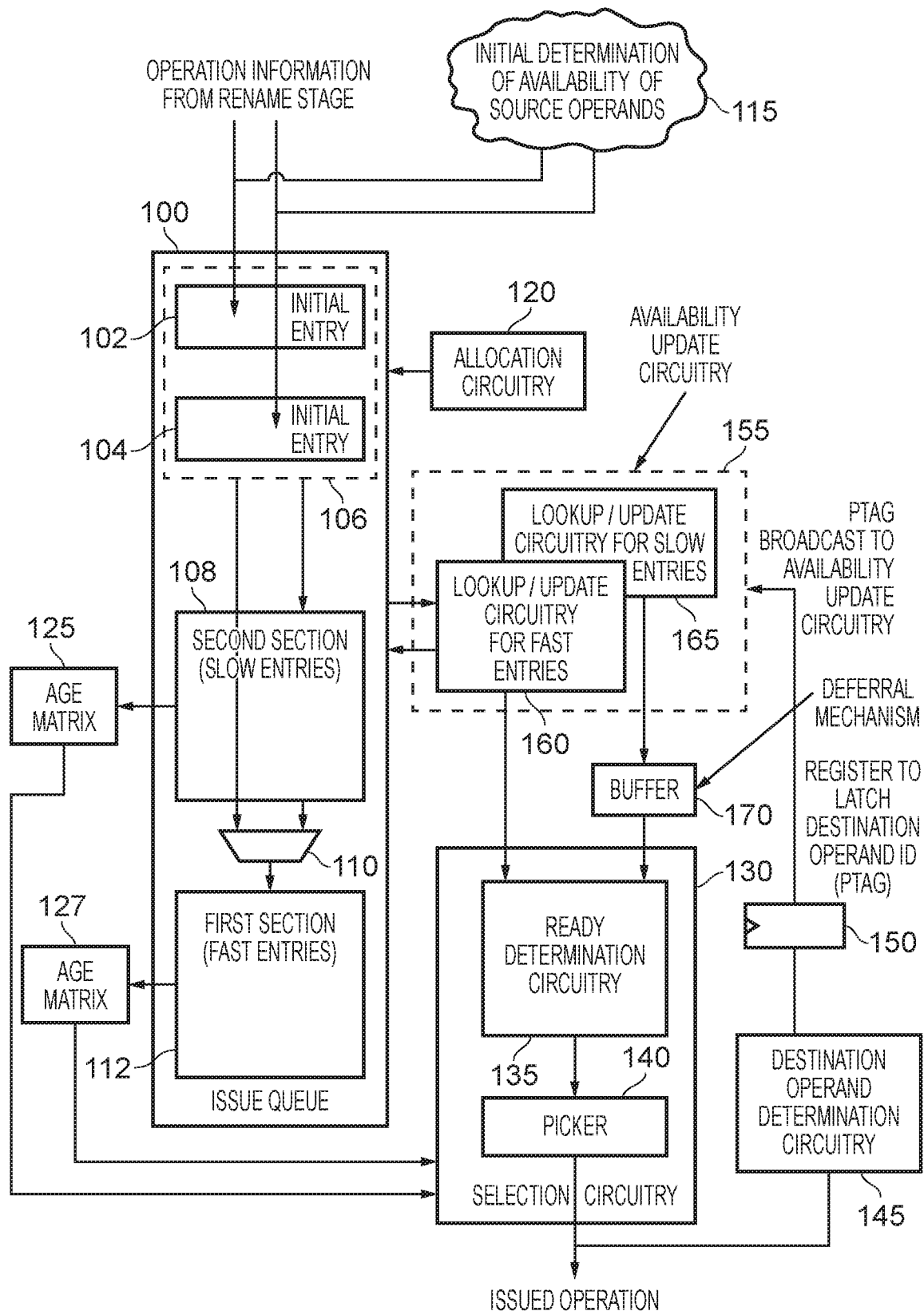
FIG. 2 is a block diagram illustrating an arrangement of an issue queue used in one example implementation.

FIG. 2 is a diagram illustrating in more detail components provided in association with the issue queue provided in the issue stage 16 of FIG. 1. As shown in FIG. 2, the issue queue 100 comprises a first section 112 and a second section 108, where in one example implementation each of the sections comprises a plurality of entries, and where each entry can be used to store operation information for an operation to be performed by one of the execution units 21, 22, 24, 26 within the execute stage 18. In some implementations a separate issue queue 100 might be provided for each of the execution units 21, 22, 24, 26, but in an alternative implementation a single issue queue 100 may be provided for multiple of the execution units 21, 22, 24, 26.

Herein, the entries within the first section 112 will be referred to as fast entries, whilst the entries within the second section 108 will be referred to as slow entries. As will be apparent from the following discussion, the reference to fast and slow in respect of these entries is a description of the behaviour of the entry in respect of a wake event from a performance perspective. In particular, when all of the required source operands for an operation stored in a particular entry become available, then that entry is viewed as being woken, since it then becomes a candidate entry from which selection circuitry 130 can select the operation to be issued to the execute stage 18. As will be apparent from the discussion herein, following such a wake event in relation to an entry in the second section, there is a delay in that associated operation becoming available to the selection circuitry 130 for selection as an issued operation.

The issue queue may include a number of write ports, and in FIG. 2 is shown having two write ports, enabling the operation information for two operations to be received simultaneously into the issue queue. Allocation circuitry 120 is used to determine whether to allocate newly received items of operation information into an entry of the first section or into an entry of the second section, and details of the process adopted by the allocation circuitry in one example implementation will be discussed later with reference to FIG. 3. Assuming the allocation circuitry can perform its allocation analysis quickly enough, the received items of operation information could be directed immediately into the relevant entry in the first section 112 or the second section 108. However, as shown in FIG. 2, in one example the issue queue 100 includes a number of initial entries 106, in this specific example two initial entries 102, 104 being provided, namely an initial entry for each write port. Hence, each new item of operation information is initially buffered within one of the initial entries 102, 104, and from there is routed to either the first section 112 or the second section 108 dependent on the analysis performed by the allocation circuitry 120.

In one example implementation, the allocation circuitry 120 is arranged to apply allocation criteria so as to ensure an age ordering between the operations whose operation information is stored in entries of the first section 112 and the operations whose operation information is stored in entries of the second section 108. As a result, it is ensured that all operations whose operation information is stored in entries of the first section are older than all operations whose operation information is stored in entries of the second section. The allocation process performed in one particular implementation in order to achieve this age ordering will be discussed later with reference to FIG. 3.

However, in the example implementation shown in FIG. 2 there is no requirement for a strict age ordering to be adopted between the various entries of a particular section, and accordingly any newly received item of operation information can be stored into any available entry within the section to which the allocation circuitry decides to route that item of operation information. A separate age ordering storage can be used to then keep track of the relative ages of the active entries within the respective sections, the active entries being the entries that currently store operation information for pending operations awaiting issuance to the execute stage. In one particular example, this age ordering storage can be implemented by the age matrices 125, 127 provided in association with each section. The information stored in each age matrix can take a variety of forms, that essentially identifies a relative age of each of the active entries within the associated section, with that information being available to the selection circuitry 130 when determining the next operation to be issued to the execute stage.

The operation information is received by the issue queue 100 from the rename stage 12, and will identify the operation to be performed, and the source operands required for that operation. It will also typically identify a destination operand, e.g. a physical register to which the result should be written. Whilst some source operands can be immediate values, it is often the case that one or more of the source operands are specified with reference to one of the physical registers, and logic 115 can be used to perform an initial determination of the availability of such source operands, and to provide that information as part of the operation information received by the issue queue. Hence, at the time of initial allocation it may be that one or more of the source operands are already available for the associated operation, and that availability information can be captured within the operation information. However, there may be one or more source operands which are not yet available, and accordingly the availability information associated with such source operands will indicate that fact.

As discussed earlier, an operation can only become a candidate for selection by the selection circuitry 130 when its source operands are considered available, and for any operation allocated into the issue queue which does not at the outset have all of its source operands available, then the source operand availability for the associated entry will need to be updated to take into account operations subsequently issued by the selection circuitry. This functionality can be performed by the availability update circuitry 155 shown in FIG. 2, using a process that will be discussed in more detail below.

Figure 8:
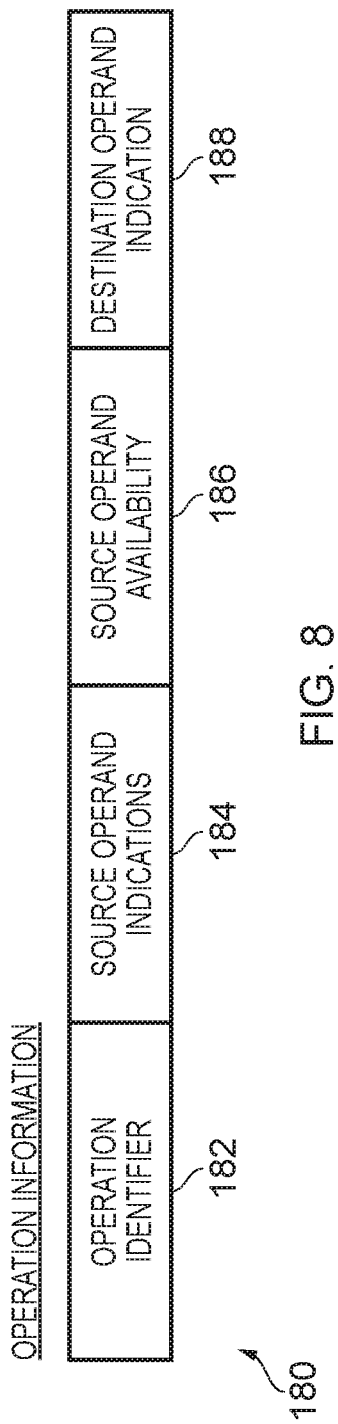
FIG. 8 schematically illustrates fields that may be provided within each item of operation information stored within an entry of the issue queue, in accordance with one example implementation.

FIG. 8 schematically illustrates fields that may be provided in association with each item of operation information 180 stored within an entry of the issue queue 100. A first field 182 is used to identify the operation associated with that entry, whilst a field 184 is used to identify the various source operands. In the event that an immediate value is provided as one of the source operands, that immediate value can be provided within this field, and for operand values that are specified with reference to registers, then register identifiers can be used in this field to identify those source operands. The field 184 can be viewed as consisting of a number of sub-fields, one for each source operand.

The field 186 provides source operand availability information, to identify whether the required source operands are available. In one example implementation, the source operand availability field 186 can be considered to comprise a number of sub-fields, with each sub-field providing a status flag for an associated source operand. Only when the status flags indicate that all of the source operands are available will the operation identified by the operation information 180 be considered as a candidate for selection by the selection circuitry 130.

As also shown in FIG. 8, a destination operand field 188 is used to provide an indication of the destination operand associated with the operation. This information is extracted by the destination operand determination circuitry 145 for a selected operation, so that it can be forwarded to the availability update circuitry to enable source operand availability information for dependent operations stored in the issue queue to be updated.

As discussed earlier, there are a series of logical functions to be performed to implement a scheduler loop for the issue queue, and these functions form a critical loop. This scheduler loop is shown in FIG. 2 by the path from the selection circuitry 130 through the destination operand determination circuitry 145 and via the latch 150 to the availability update circuitry 155 which in turn provides its output to the selection circuitry 130. In the example shown in FIG. 2, at the end of a current selection iteration (i.e. a current iteration of the scheduler loop), the destination operand of the operation selected for issue is latched within the register 150. In the next selection iteration, that value is output to the availability update circuitry 155, in order to enable the source operand availability information for the active entries within the issue queue to be updated, with that updated information being forwarded to the selection circuitry 130 to enable a next operation to be selected and issued, and with the destination operand determination circuitry 145 then determining the destination of that selected operation so that that can be stored within the register 150 at the end of that next selection iteration. Typically, it is desirable for that entire iteration of the loop to occur within a single cycle, and it has been found that this scheduler loop becomes a critical loop in dictating the overall frequency at which the apparatus can operate, in order to enable all of the required functionality to be performed within a single clock cycle.

As shown in FIG. 2, this single cycle scheduling is still performed in respect of the fast entries, i.e. the entries within the first section 112, but a deferral mechanism 170 is used to decouple the slow entries from the critical path of the scheduler loop. Hence, at the start of a current selection iteration (i.e. iteration of the scheduler loop), the destination operand latched in register 150 (i.e. the destination for the operation issued in the preceding selection iteration) is broadcast to the components forming the availability update circuitry 155. In FIG. 2, this destination operation is referred to as a PTAG value. In particular, in the example implementation, renaming is used within the stage 12 of the apparatus to map architectural registers specified by instructions to physical registers within the register set 14, and these physical registers are identified by PTAG values.

As shown in FIG. 2, the availability update circuitry 155 comprises lookup/update circuitry for the fast entries 160 (i.e. for the entries in the first section 112) and lookup/update circuitry for the slow entries 165 (i.e. the entries in the second section 108). The fast entry update process in on the critical path, and accordingly the lookup/update circuitry for the fast entries 160 needs to perform a lookup operation in respect of the entries in the first section 112 in order to update source operand availability for any dependent entries (i.e. any entries storing operation information for operations that will use as a source operand the destination operand broadcast from the register 150), and then to pass that updated information to the selection circuitry to enable the remainder of the scheduler loop to be performed in the same clock cycle. The lookup/update circuitry can be arranged in a variety of ways, but in one example implementation a content addressable memory (CAM) lookup procedure is used in order to access and update the various entries in the first section. The updated availability information is then forwarded to the selection circuitry 130, and in particular to the ready determination circuitry 135 within the selection circuitry.

However, as shown in FIG. 2, the lookup/update circuitry for the slow entries 165 is off of the critical path, since it does not need to produce its output in time for it to be made available to the selection circuitry 130 during the same selection iteration. Instead, the updated availability information from the lookup/update circuitry for the slow entries 165 is passed to the deferral mechanism 170, which in one example takes the form of buffer circuitry. In particular, the buffer circuitry can be used to defer onward provision of that updated availability information to the selection circuitry 130 by at least one clock cycle. In one particular implementation, latches are used to implement the buffer circuitry, resulting in a single cycle delay in the provision of the updated availability information to the selection circuitry. This means that there is a significantly more relaxed timing with regards to the operation of the lookup/update circuitry for the slow entries 165. Again, a CAM lookup procedure can be used in order to access the entries in the second section 108, and all that is required is that that is performed in time for the updated availability information to be buffered within the buffer 170 at the end of the current selection iteration.

Accordingly, by this process, it will be understood that the information provided to the ready determination circuitry 135 is one cycle delayed in respect of the entries in the second section 108, and hence provides an indication of the source availability of the operations identified by entries in the second section that existed in the cycle prior to the current selection iteration being considered by the selection circuitry 130.

The ready determination circuitry 135 analyses the source operand availability information provided from the availability update circuitry 155, and in particular the information provided by the lookup/update circuitry for the fast entries 160 and the information forwarded on from the buffer 170 in respect of the slow entries, and determines which entries identify operations that are candidates for selection during the current selection iteration. As discussed earlier, for an operation to be a candidate for selection, all of its source operands must be available. In addition, certain other criteria may be taken into account by the ready determination circuitry, such as availability of any other shared resources, and any other preconditions.

Based on the analysis performed by the ready determination circuitry 135, the picker circuitry 140 is provided with an indication of any operations that are available for selection, and then applies selection criteria in order to select one of those operations as the next operation to issue. For instance, the picker circuitry may apply an age ordering criteria in order to seek to select the oldest operation from amongst those indicated by the ready determination circuitry 135 as being available for selection.

In addition to the operation being issued by the picker circuitry 140 to the execute stage 18, an indication of the selected operation is also provided to the destination operand determination circuitry 145, which then determines the destination operand for the selected operation. In particular, as will be apparent from the earlier discussed FIG. 8, the operation information 180 will include a field 188 providing an indication of the destination operand, and the destination operand determination circuitry 145 is arranged to capture the information in that field and cause it to be latched within the register 150 at the end of the current selection iteration. The above-described process can then be repeated in the next selection iteration, in order to select the next operation to be issued.

As mentioned earlier, a single issue queue could be provided for all of the execution units in the execute stage 18, or instead separate issue queues could be provided for each such execute unit. In the event of a single issue queue being used, the components in the scheduler loop may be modified so that more than one instruction can be issued each selection iteration, for example one operation may be issued to one execute unit, another operation may be issued to another execute unit, etc. In an implementation where separate issue queues are maintained for each of the execution units, then in one example implementation the circuitry of FIG. 2 can be replicated for each issue queue, with the selection circuitry 130 choosing at most a single operation to issue during any particular selection iteration, and with that selected operation being routed to the associated execution unit within the execute stage 18.

Figure 3:
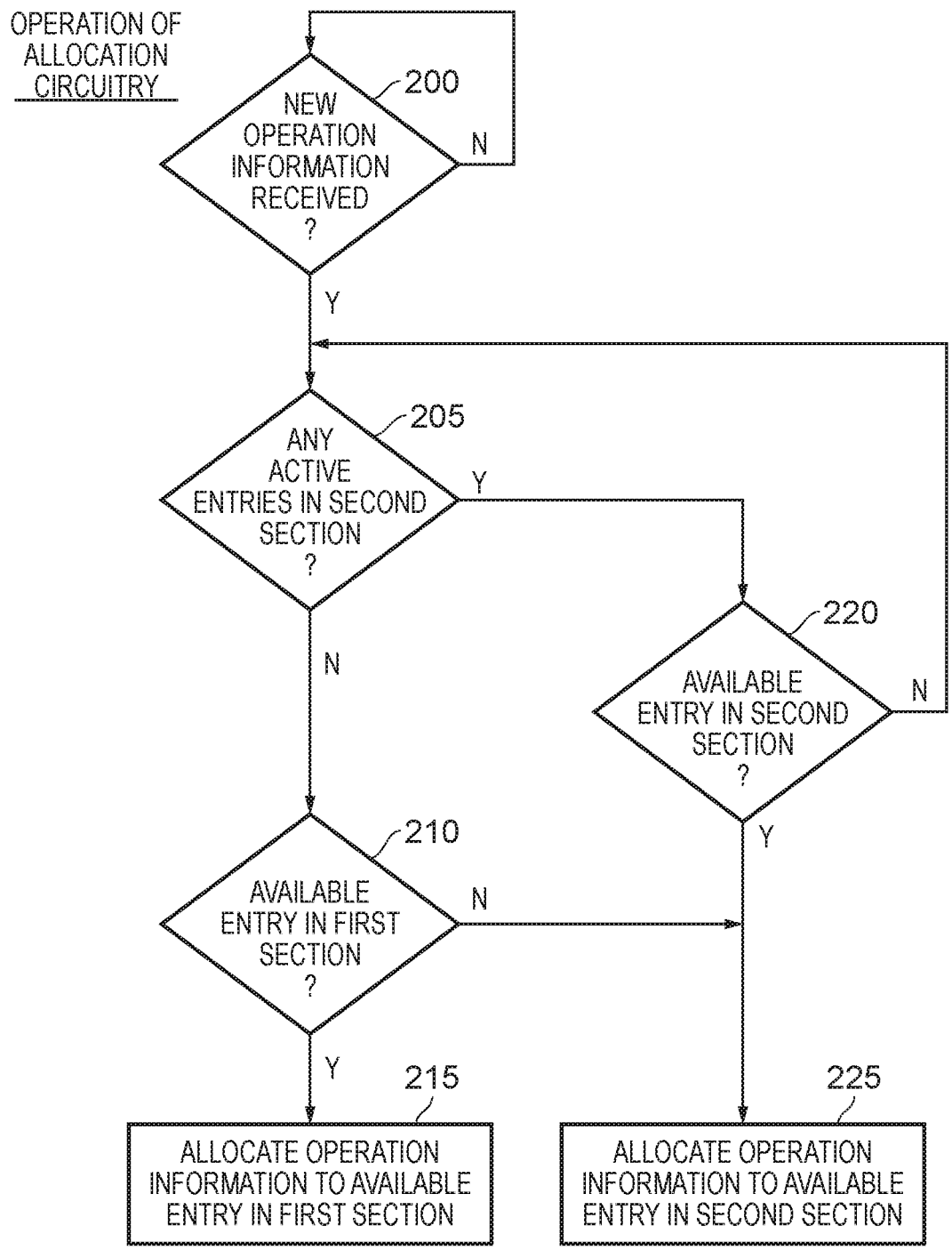
FIG. 3 is a flow diagram illustrating the operation of the allocation circuitry of FIG. 2 in one example implementation.

FIG. 3 is a flow diagram illustrating the operation of the allocation circuitry 120 of FIG. 2 in one example implementation. In particular, the allocation circuitry 120 monitors the information received into the initial entries 102, 104 of the issue queue 100. When at step 200 it is determined that new operation information has been received, it is determined at step 205 whether any active entries are present in the second section, i.e. whether the second section contains any pending operations awaiting issuance. If not, it is then determined at step 210 whether there is an available entry in the first section, i.e. whether there is a free entry that is not currently storing information about a pending operation. If so, then at step 215 the operation information can be allocated to an available entry in the first section.

However, if at step 205 it is determined that there is at least one active entry in the second section then the process proceeds to step 220 where it is determined whether there is an available entry in the second section, i.e. whether the second section is not yet full. Assuming there is an available entry, then the process proceeds to step 225 where the operation is allocated into an available entry in the second section. The process also proceeds to step 225 if at step 210 it is determined that there is not an available entry in the first section, i.e. the first section is currently full.

Further, if at step 220 it is determined that there is not an available entry in the second section, then the process returns to step 225, and in particular at this point the new operation information remains in the initial entry until such time as it can be moved to either the first section or the second section. This may for example mean that the issue queue is unable to accept new operation information during the next cycle, until at least one of the initial entries is available.

By adopting the approach shown in FIG. 3, it will be appreciated that an age ordering is maintained between the entries in the first section and the entries in the second section, and indeed with respect to the entries in the initial section 106 to the extent that operation information needs to be retained therein rather than moved immediately into the first section or the second section.

When operation information is allocated into an entry in the first section or the second section, then the associated age matrices 127, 125 will be updated so as to keep track of the relative age of the operations stored within the various entries of the associated section. This information can be provided to the selection circuitry 130 to enable the picker circuitry 140 to apply an age ordering criteria when selecting an operation to issue.

In one example implementation, the allocation circuitry 120 is also used to control movement of operation information from entries of the second section into entries of the first section. In particular, it will be appreciated from FIG. 3 that operation information is only allocated into the second section due to there already being operation information in an active entry of the second section, or due to the first section being full. As space becomes available within the first section, the allocation circuitry seeks to migrate operation information from the second section to the first section so as to maintain the age ordering between the sections, and to free up space to enable new items of operation information to be moved out of the initial entries into the first or second sections.

Figure 4:
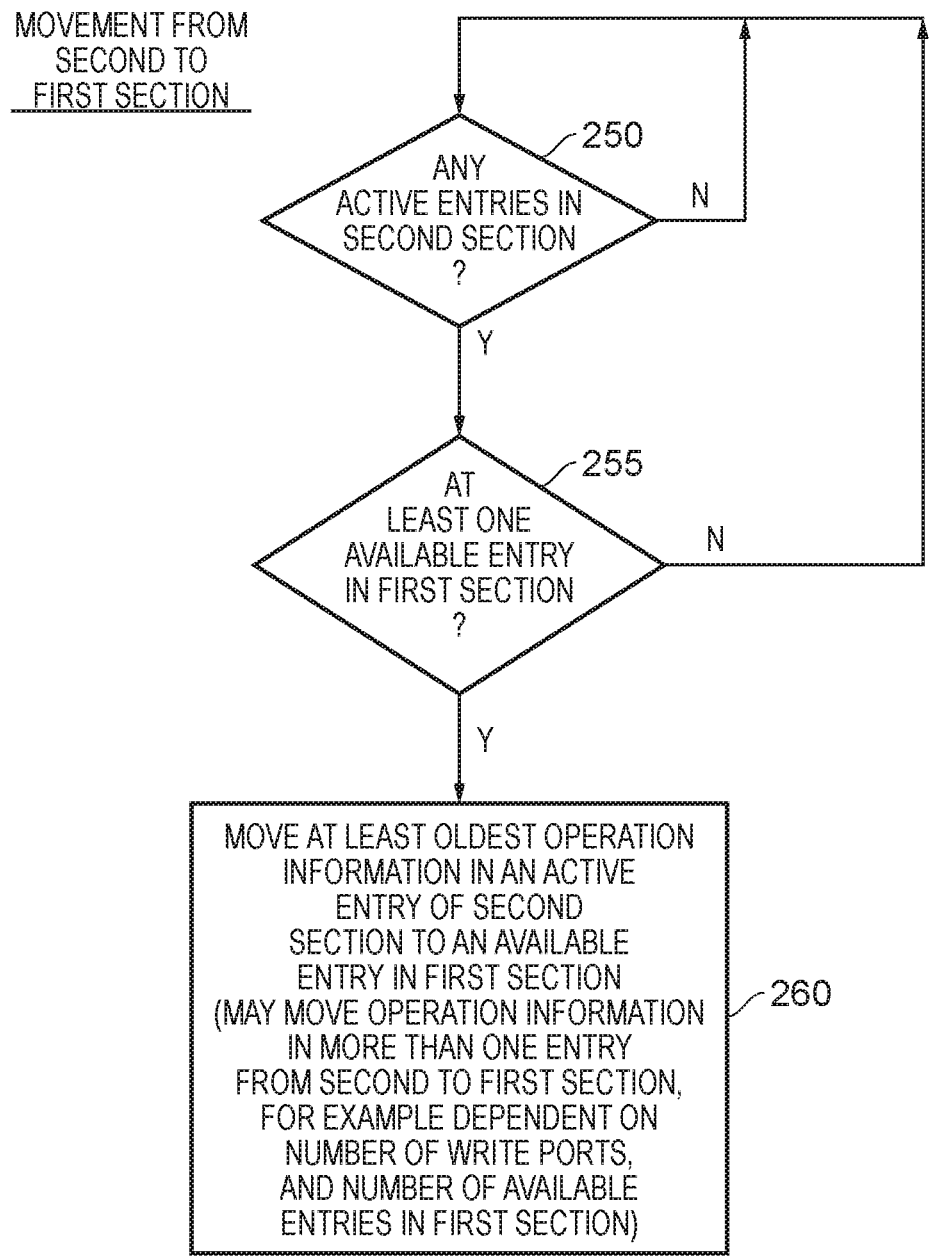
FIG. 4 is a flow diagram illustrating how operation information may be migrated from entries in the second section to entries in the first section of the issue queue, in accordance with one example implementation.

FIG. 4 illustrates a process which may be employed to control the movement of operation information from the second section 108 to the first section 112. At step 250 it is determined whether there are any active entries in the second section, and if not no action is required. However, whenever there is at least one active entry in the second section, it is determined at step 255 whether there is at least one available entry in the first section. Assuming there is at least one available entry in the first section, then at step 260 at least the oldest operation information in an active entry of the second section is moved to an available entry in the first section.

It is possible to move more than one item of operation information in a particular clock cycle, dependent on the number of write ports provided, and the number of available entries in the first section. In the example shown in FIG. 2 there are two write ports, and hence potentially two items of information from the second section could be moved into the first section in a single cycle.

Through use of the process discussed above with reference to FIGS. 3 and 4, it will be appreciated that operations placed within slow entries will move down into fast entries as availability allows, unless they get picked by the picker 140 and deallocated beforehand. It should also be noted that the movement between the second section and the first section, and from the initial section 106 into the relevant one of the first section and the second section, may be optimised in the implementation described, so as to minimise the movement required. In particular, in the absence of there being active entries in the second section, operation information will move directly from an initial entry in to the first section. Since multiple entries may move in a single cycle, it will be appreciated that various movements can be optimised so as to seek to minimise the moves required whilst still ensuring age ordering. Hence, as a very specific example, if two new items of operation information are received into the initial entries 102, 104, and there is one existing active entry in the second section 108, then the operation information in the second section 108 may be moved to a fast entry in the first section, the older operation in the initial entries can be moved directly into a fast entry of the first section, and the younger of the two entries in the initial entries can be moved into a slow entry of the second section 108.

Figure 5:
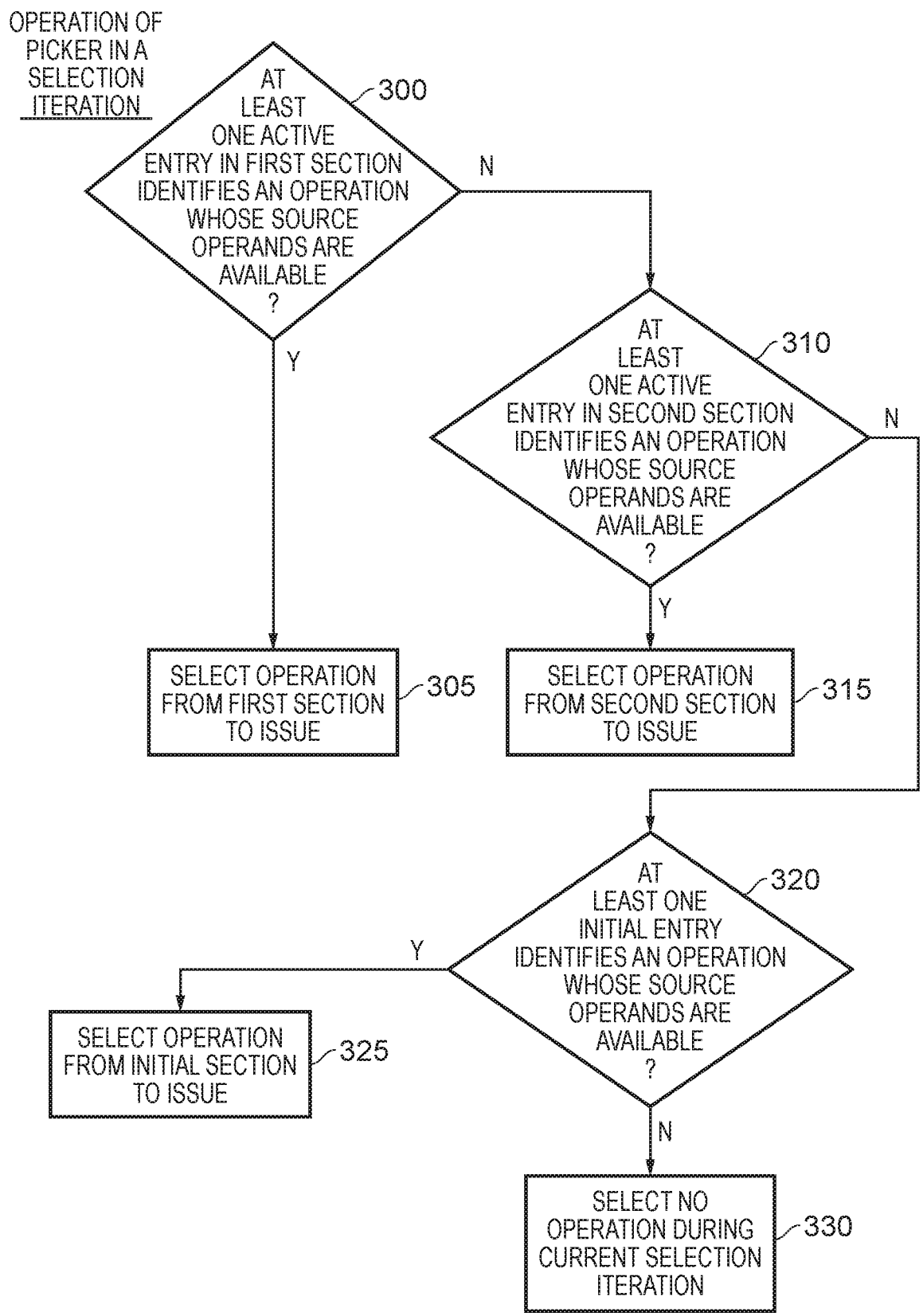
FIG. 5 is a flow diagram illustrating the operation of the picker within the selection circuitry of FIG. 2 in accordance with one example arrangement.

FIG. 5 is a flow diagram illustrating the operation of the picker circuitry 140 of FIG. 2 in one example implementation. At step 300, it is determined whether there is at least one active entry in the first section that identifies an operation whose source operands are available. If so, then at step 305 the picker circuitry 140 selects an operation from the first section to issue. As discussed earlier, in the event that there is more than one such entry in the first section, then the age ordering information from the age matrix 127 can be taken into account by the picker in order to select the oldest of those operations for issuance.

If there are no available operations to select from the first section, then the process proceeds to step 310 where it is determined whether there is at least one active entry in the second section that identifies an operation whose source operands are available. As discussed earlier, there will be at least one cycle of delay in the provision of updated source availability information to the picker 140 for entries in the second section 108 due to the deferral mechanism 170, and hence during a current selection iteration the picker is considering the availability that existed in respect of the second section entries during a preceding selection iteration.

If there is at least one entry in the second section whose source operands are available, then the process proceeds to step 315 where an operation is selected from the second section 108 to issue to the execution unit. Again, if there is more than one available operation in the second section, then the age ordering information from the age matrix 125 may be taken into account by the picker so as to seek to select the oldest of those operations for issuance.

If it is determined at step 310 that there are no available entries in the second section for selection, then at step 320 it is determined whether there is at least one initial entry that identifies an operation whose source operands are available, and if so an operation is selected from the initial section 106 at step 325. In the event that both of the entries in the initial section 106 contain pickable operations, then the oldest of those operations will be selected at step 325. If at step 320 it is determined that there are no selectable operations in the initial section 106, then at step 330 it is determined that no operation is selected during the current selection iteration.

Figure 6:
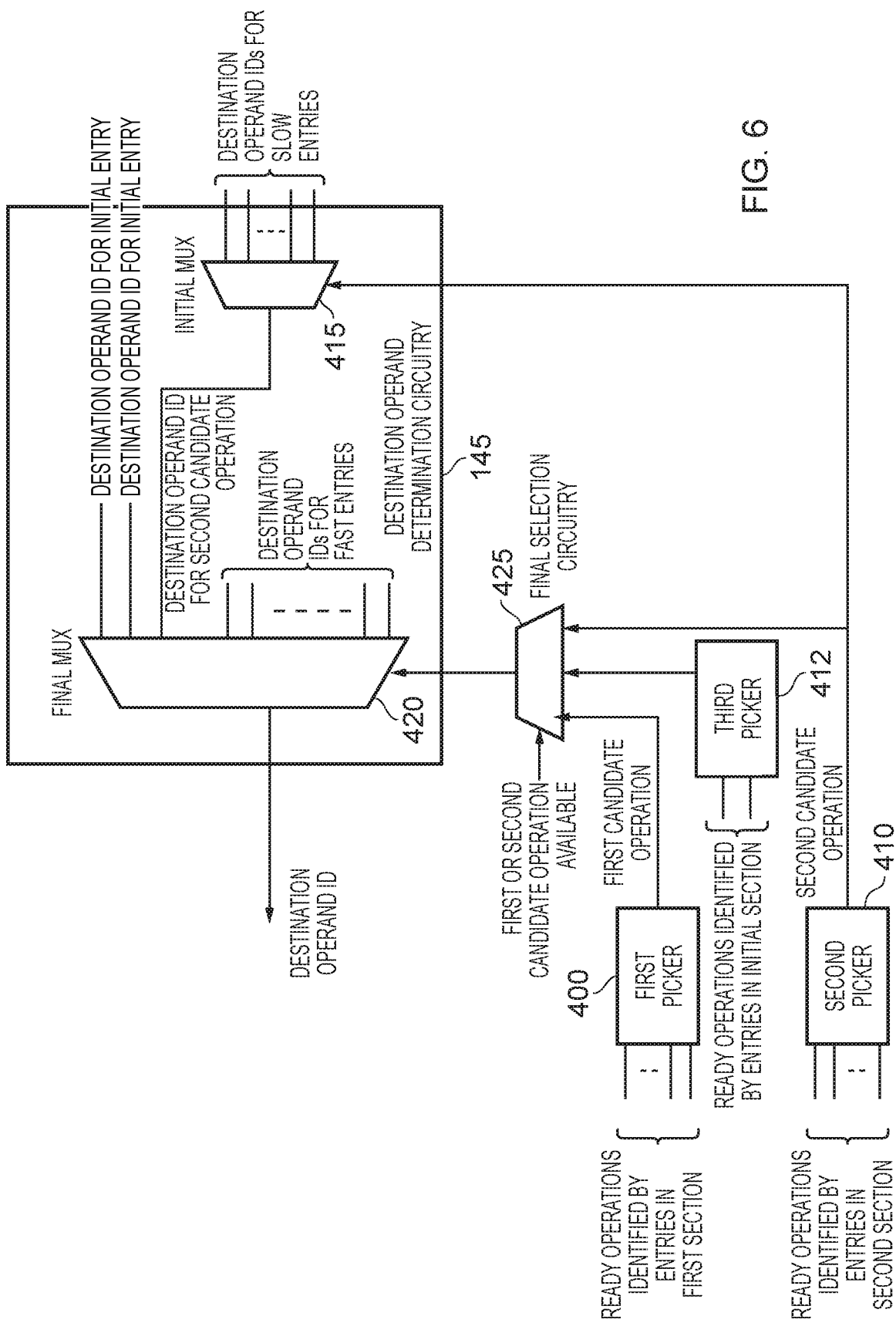
FIG. 6 illustrates an implementation where the picker circuitry includes separate pickers for the first and second sections, and an arrangement of destination operand determination circuitry that may be used in one such implementation.

FIG. 6 illustrates one example implementation where the picker circuitry 140 is actually formed of a number of separate picker circuits, including at least a first picker 400 and a second picker 410, and in this case a third picker 412. The first picker 400 chooses between any ready operations identified by entries in the first section whilst the second picker 410 chooses between any ready operations identified by entries in the second section. If the first picker 400 is able to select a first candidate operation, then this will take precedence over the second candidate operation chosen by the second picker, and this functionality is implemented by the final selection circuitry 425 which in one implementation can take the form of a multiplexer that chooses the first candidate operation in the event that a valid first candidate operation is selected, and otherwise chooses the second candidate operation in the event that a valid second candidate operation is selected by the second picker. The third picker 412 can be used to select an operation from the initial section if at least one of the initial entries identifies an operation whose source operands are available. In the described example with reference to FIG. 2 there are two initial entries that are age ordered (i.e. the contents of one is always older than the content of the other), so the older operation is picked if it is ready and otherwise the younger operation is picked if it is ready. The multiplexer 425 can select an operation indicated by the third picker 412 if neither the first picker 400 nor the second picker 410 indicates a valid operation ready to be selected.

By employing a separate second picker this can give rise to certain implementation benefits. In particular, as will be apparent from FIG. 2, the information about the source operand availability for entries in the second section is available directly from the buffer 170 during a given selection iteration, without needing to await the outcome of the operations performed by the availability update circuitry, and accordingly this second picker 410 can be activated prior to the first picker 400, since the first picker needs to wait for the updated availability information from the lookup/update circuitry for the fast entries 160. The second picker 410 can also be activated before the third picker 412.

This can also yield downstream performance improvements in the operation of the destination operand determination circuitry 145, as shown by the specific example implementation in FIG. 6. In particular, in this implementation the destination operand determination circuitry includes an initial multiplexer 415 to select between the various destination operand identifiers for the slow entries, based on the second candidate operation produced by the second picker. This results in the output of a single signal as one of the inputs to the final multiplexer 420, with the final multiplexer also receiving the destination operation identifiers for all of the fast entries and the initial entries. Hence, by the time the output from the final selection circuitry 425 is available, the final multiplexer 420 can be driven directly by that output signal to output the destination operand identifier. Thus, the final multiplexer can be made smaller than would otherwise be the case if it had to receive an input for each of the entries in both the first section and the second section.

In particular, in the example shown in FIG. 6, the total number of inputs to the final multiplexer 420 can be set equal to the number of entries in the first section, plus the number of entries in the initial section 106, plus one input for all of the entries in the second section, since the initial multiplexer 415 will have done an initial filtering in respect of those second section entries to produce only a single destination operand identifier in relation to the entries of the second section. Since the size of the final multiplexer is thus reduced, this can improve the speed of operation of the destination operand determination circuitry 145.

Figure 7:
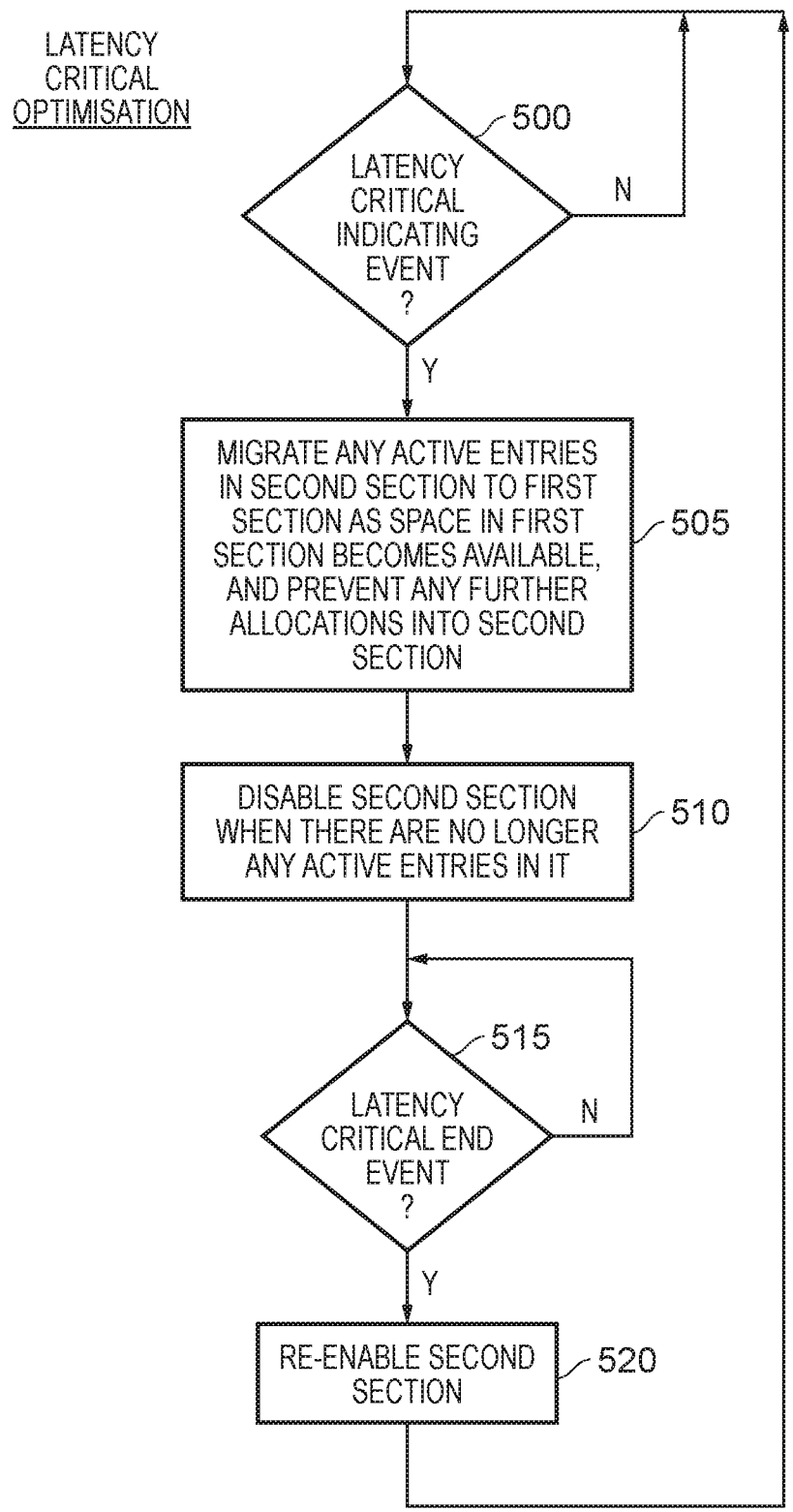
FIG. 7 illustrates how the utilisation of the issue queue may be altered in the presence of a latency critical indicating event, in accordance with one example arrangement.

In one example implementation, use of the first and second sections can be made configurable. In particular, in a normal use scenario both of the first and second sections will be used, and the issue queue will operate in the manner as discussed earlier. However, upon occurrence of one or more identified events, it can be decided to disable the second section, thereby reducing the effective size of the issue queue. This could for example be used in certain latency critical scenarios. FIG. 7 is a flow diagram illustrating a process that may be employed in order to implement such functionality. Accordingly, at step 500, it is determined whether a latency critical indicating event has occurred, and when such an event is detected the process proceeds to step 505 where any active entries in the second section are migrated to the first section as space in the first section becomes available, and at the same time any further allocations are prevented into the second section.

As mentioned earlier, instead of basing selective disablement of the second section on detecting a latency critical event, the selective disablement of use of the second section may be arranged to occur on detecting that there is little or no parallelism available when performing the operations, and hence step 500 would in that case be a detection of a low degree of parallelism being available.

Following step 505, then at step 510 the second section is disabled when there are no longer any active entries in it. Thereafter, it will be appreciated that new items of operation information can still be received into the initial entries 106, but that they will be migrated directly down into the first section 112 as soon as space is available in the first section. The lookup/update circuitry for the slow entries 165 is then no longer required whilst in this reduced size mode of operation, but the main timing critical scheduler path continues to operate in the same manner as discussed earlier with reference to the fast entries.

At step 515, it is determined whether there is a latency critical end event, and when it is determined that such an event has arisen, then at step 520 the second section can be re-enabled.

From the above-described example implementation, it will be appreciated that the technique described herein enables the effective capacity of the issue queue to be increased, thereby increasing the instruction window size, and enabling an increase in performance of an OOO processor. Further, this increase in size can be achieved without adversely impacting the timing of the scheduler loop, which is a timing critical function within the processor. As an alternative to increasing the size of an issue queue, the size of the issue queue could remain the same, but the scheduler functionality would be able to be performed at a higher frequency, and accordingly an increase in performance could be achieved in that manner rather than increasing the overall size of the issue queue if desired.

As described herein, movement between the second and first sections of the issue queue can be managed in order to maintain a desired age ordering, and that movement can be performed independent of any picking and deallocating of operations.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
an issue queue comprising a first section and a second section, each of the first section and the second section comprising a number of entries, and each of the number of entries employed to store operation information identifying an operation to be performed by a processing unit;
allocation circuitry to receive operation information for a plurality of operations, and to apply allocation criteria to determine, for each of the plurality of operations, whether to allocate the operation information to an entry in the first section or an entry in the second section, the operation information being arranged to identify each source operand required by the associated operation and availability of each source operand;
selection circuitry to select from the issue queue, during a given selection iteration, an operation to be issued to the processing unit, the selection circuitry being arranged to select the operation to be issued from amongst one or more of the plurality of operations whose required source operands are available;
availability update circuitry to update source operand availability for each of the number of entries whose operation information identifies as a source operand a destination operand of the selected operation in the given selection iteration; and
a deferral mechanism to inhibit from selection by the selection circuitry, during at least a next selection iteration following the given selection iteration, any operation associated with an entry in the second section whose required source operands are now available due to the operation associated with the entry in the second section having as a source operand the destination operand of the selected operation in the given selection iteration.

2. An apparatus as claimed in claim 1, wherein:
the deferral mechanism is arranged to defer provision to the selection circuitry of the updated source operand availability determined by the availability update circuitry for any operation associated with an entry in the second section whose required source operands are now available due to the operation associated with the entry in the second section having as a source operand the destination operand of the selected operation in the given selection iteration.

3. An apparatus as claimed in claim 2, wherein the deferral mechanism comprises a buffer storage.

4. An apparatus as claimed in claim 1 wherein:
the allocation circuitry is arranged to apply, as the allocation criteria, criteria to ensure an age ordering between the operations whose operation information is stored in entries of the first section and the operations whose operation information is stored in entries of the second section, such that all operations whose operation information is stored in entries of the first section are older than all operations whose operation information is stored in entries of the second section.

5. An apparatus as claimed in claim 4, wherein:
the allocation circuitry is further arranged to migrate operation information from an entry in the second section to an entry in the first section in order to maintain the age ordering.

6. An apparatus as claimed in claim 4, wherein the allocation circuitry is arranged to migrate operation information from an entry in the second section to an entry in the first section when the first section has an available entry.

7. An apparatus as claimed in claim 4, wherein:
the allocation circuitry is arranged, when applying the allocation criteria, to allocate received operation information into an available entry of the first section when the second section has no active entries, where an active entry is an entry that stores operation information for an operation awaiting issuance to the processing unit.

8. An apparatus as claimed in claim 7, wherein:
the allocation circuitry is arranged, when applying the allocation criteria, to allocate received operation information into an available entry of the second section when the second section has at least one active entry.

9. An apparatus as claimed in claim 4, wherein at least one of the first section and the second section is an age-ordering unconstrained section able to store allocated operation information into any available entry without being constrained by age ordering between the entries in the age-ordering unconstrained section, and the apparatus is arranged to provide an age ordering storage to identify an age order for the operation information stored in the entries of the age-ordering unconstrained section.

10. An apparatus as claimed in claim 4, wherein:
the selection circuitry is arranged to preferentially select, from amongst the one or more of the plurality of operations whose required source operands are available, an operation whose operation information is stored in an entry of the first section.

11. An apparatus as claimed in claim 10, wherein the selection circuitry comprises:

a first picker for selecting a first candidate operation from amongst operations whose operation information is stored in an entry of the first section and whose required source operands are available;

a second picker for selecting a second candidate operation from amongst operations whose operation information is stored in an entry of the second section and whose required source operands are available; and final selection circuitry to choose the first candidate operation as the selected operation unless no valid first candidate operation is available, in which event the final selection circuitry is arranged to choose the second candidate operation as the selected operation.

12. An apparatus as claimed in claim 11, wherein:

the second picker is arranged to perform selection of the second candidate operation in the next selection iteration before the availability update circuitry has produced the updated source operand availability, whilst the first picker is arranged to await the updated source operand availability from the availability update circuitry for any entries in the first section before performing selection of the first candidate operation in the next selection iteration.

13. An apparatus as claimed in claim 12, further comprising:

destination determination circuitry to determine the destination operand of the selected operation in each selection iteration;

wherein the destination determination circuitry comprises:

initial evaluation circuitry to determine the destination operand for the second candidate operation and thereby exclude the destination operands for any other operations whose operation information is stored in an entry of the second section; and final evaluation circuitry to determine the destination operand for the selected operation when the final selection circuitry has chosen the selected operation, the final evaluation circuitry ignoring any destination operands excluded by the initial evaluation circuitry.

14. An apparatus as claimed in claim 13, wherein:

the initial evaluation circuitry is formed as first level multiplexing circuitry to select the destination operand for the second candidate operation from amongst the possible destination operands for the entries in the second section; and the final evaluation circuitry is formed as second level multiplexing circuitry to select the destination operand for the selected operation from amongst the possible destination operands for the entries in the first section and the destination operand for the second candidate operation as output by the first level multiplexing circuitry.

15. An apparatus as claimed in claim 1, wherein:

the selection circuitry is arranged to apply an age ordering criteria when selecting the operation to be issued from amongst the one or more of the plurality of operations whose required source operands are available, so as to preferentially select the oldest operation from amongst the one or more of the plurality of operations whose required source operands are available.

16. An apparatus as claimed in claim 1, wherein:

the issue queue includes a number of initial entries into which the received operation information is initially stored prior to the allocation circuitry determining whether to allocate the received operation information into an entry of the first section or an entry of the second section.

17. An apparatus as claimed in claim 16, wherein the selection circuitry is arranged to select the operation from an initial entry when the required source operands for the operation are available and none of the entries in the first and second sections store operation information for an operation whose required source operands are available.

18. An apparatus as claimed in claim 1, wherein in response to at least one latency critical indicating event, the issue queue is arranged to disable use of the second section.

19. A method of operating an issue queue, comprising:

arranging the issue queue to have a first section and a second section, each of the first section and the second section comprising a number of entries, and each of the number of entries employed to store operation information identifying an operation to be performed by a processing unit;

receiving operation information for a plurality of operations, and applying allocation criteria to determine, for each of the plurality of operations, whether to allocate the operation information to an entry in the first section or an entry in the second section, the operation information being arranged to identify each source operand required by the associated operation and availability of each source operand;

selecting from the issue queue, during a given selection iteration, an operation to be issued to the processing unit, the selected operation to be issued being chosen from amongst one or more of the plurality of operations whose required source operands are available;

updating source operand availability for each of the number of entries whose operation information identifies as a source operand a destination operand of the selected operation in the given selection iteration; and employing a deferral mechanism to inhibit from selection, during at least a next selection iteration following the given selection iteration, any operation associated with an entry in the second section whose required source operands are now available due to the operation associated with the entry in the second section having as a source operand the destination operand of the selected operation in the given selection iteration.

20. An apparatus comprising:

issue queue means comprising a first section and a second section, each of the first section and the second section comprising a number of entries, and each of the number of entries for storing operation information identifying an operation to be performed by a processing unit;

allocation means for receiving operation information for a plurality of operations, and for applying allocation criteria to determine, for each of the plurality of operations, whether to allocate the operation information to an entry in the first section or an entry in the second section, the operation information being arranged to identify each source operand required by the associated operation and availability of each source operand;

selection means for selecting from the issue queue means, during a given selection iteration, an operation to be issued to the processing unit, the selection means for selecting the operation to be issued from amongst one or more of the plurality of operations whose required source operands are available;

availability update means for updating source operand availability for each of the number of entries whose operation information identifies as a source operand a destination operand of the selected operation in the given selection iteration; and deferral means for inhibiting from selection by the selection means, during at least a next selection iteration following the given selection iteration, any operation associated with an entry in the second section whose required source operands are now available due to the operation associated with the entry in the second section having as a source operand the destination operand of the selected operation in the given selection iteration.

* * * * *